United States Patent [19]

Cogan, Jr.

[11] Patent Number: 4,497,863
[45] Date of Patent: Feb. 5, 1985

[54] LAMINATED WEFT INSERTION FABRIC

[75] Inventor: Jerry A. Cogan, Jr., Spartanburg, S.C.

[73] Assignee: Milliken Research Corporation, Spartanburg, S.C.

[21] Appl. No.: 587,154

[22] Filed: Mar. 7, 1984

[51] Int. Cl.³ .............................................. B32B 7/00
[52] U.S. Cl. ..................................... 428/253; 66/195; 156/148; 156/281; 428/257; 428/284; 428/920
[58] Field of Search ................. 66/195; 428/253, 257, 428/284, 920, 246; 156/148, 281

[56] References Cited

U.S. PATENT DOCUMENTS

| | | | |
|---|---|---|---|
| 3,279,221 | 10/1966 | Gliksmann | 66/192 |
| 3,329,552 | 7/1967 | Hughes | 66/192 |
| 3,567,565 | 3/1971 | Jones et al. | 161/50 |
| 3,649,428 | 3/1972 | Hughes | 161/50 |
| 3,672,187 | 6/1972 | Simpson | 66/192 |
| 3,769,815 | 11/1973 | Ploch et al. | 66/85 A |
| 4,277,527 | 7/1981 | Duhl | 428/109 |
| 4,285,216 | 8/1981 | Duhl | 66/192 |
| 4,304,813 | 12/1981 | Elmore, Jr. | 428/253 |
| 4,391,871 | 7/1983 | Rogers et al. | 428/219 |
| 4,393,114 | 7/1983 | Gillespie | 428/252 |
| 4,435,467 | 3/1984 | Rogers | 428/254 |
| 4,450,196 | 5/1984 | Kamat | 428/253 |

OTHER PUBLICATIONS

Bahlo, K. W., "New Fabrics Without Weaving", *Modern Textile Magazine*, Nov. 1965, pp. 51-54.

*Primary Examiner*—James J. Bell
*Attorney, Agent, or Firm*—Earle R. Marden; H. William Petry

[57] ABSTRACT

Laminated weft insertion fabric which employes a warp knit, weft insertion substrate to provide integrity to a non-woven partially polypropylene materials used to provide insulating characteristics to the laminated fabric. The substrate is washed and dyed after knitting to allow the weft inserted textured yarn to provide bulk to the substrate.

5 Claims, 5 Drawing Figures

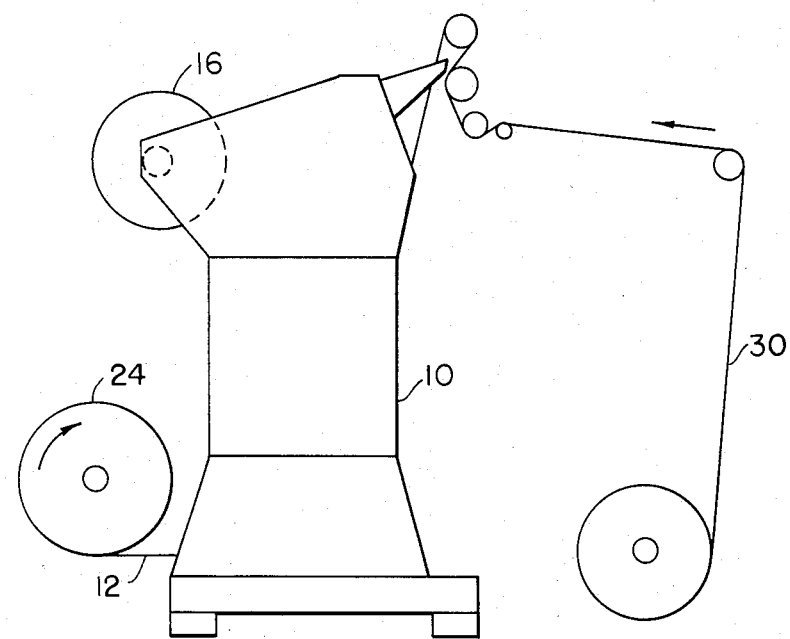
FIG.-1-
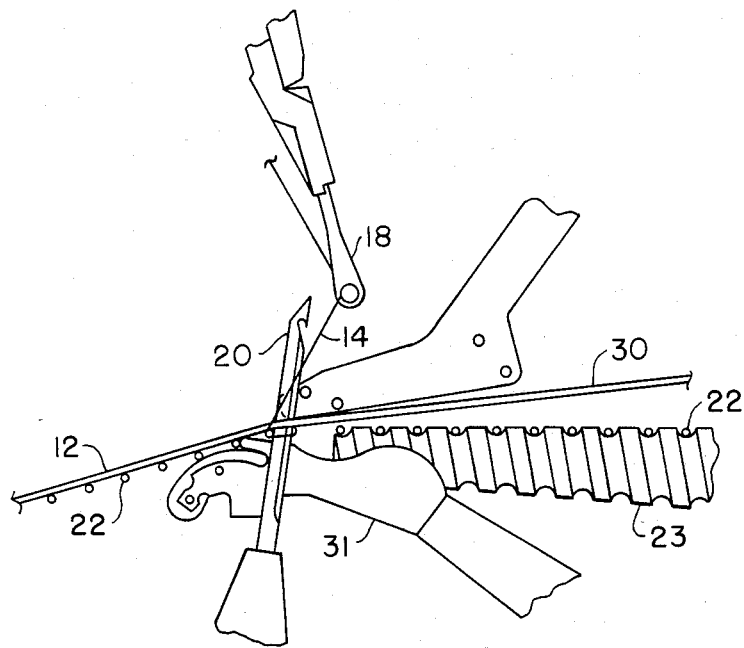
FIG.-2-

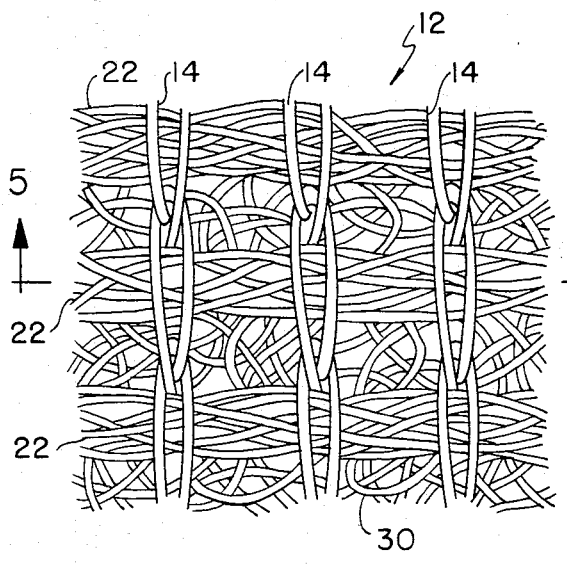
FIG. -3-
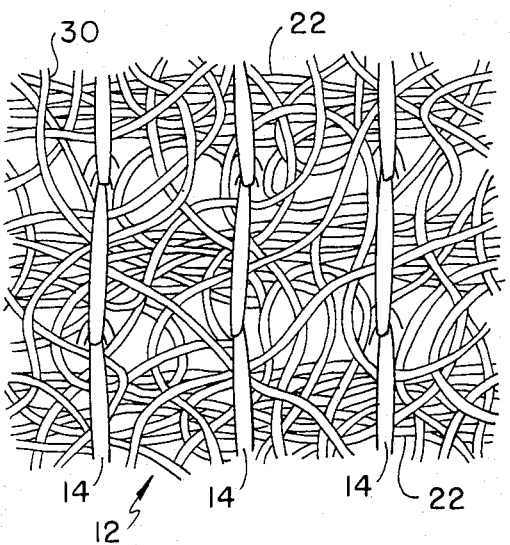
FIG. -4-
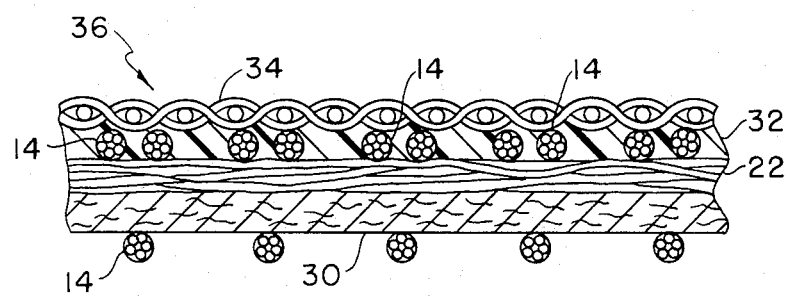
FIG. -5-

LAMINATED WEFT INSERTION FABRIC

This invention relates generally to a substrate fabric for use as an insulating medium for garments such as thermal underwear, ski jackets, etc. in which the insulating medium is dimensionally secured in a warp knit, weft insertion structure.

It has been known prior to this invention that non-woven fabrics having a high proportion of polypropylene fibers had good insulating properties but was not structurally stable under washing, wearing, and/or drying when used in garments. Such fabrics in the past have been quilted into the shell or lining of a garment to provide integrity but such operation is expensive as well as not providing the desired wear life.

Therefore, it is an object of this invention to provide an insulating fabric for use with garments which can be readily and economically manufactured and has increased integrity in use to provide longer wear life.

Other objects and advantages of the invention will become readily apparent as the specification proceeds to describe the invention with reference to the accompanying drawings, in which:

FIG. 1 is a side schematic view of the machine to produce the new substrate fabric;

FIG. 2 is a blown up view of the operating mechanism of the knitting machine shown in FIG. 1;

FIG. 3 is a technical face or top view of the substrate fabric produced on the machines of FIGS. 1 and 2;

FIG. 4 is a technical rear or bottom view of the fabric shown in FIG. 3; and,

FIG. 5 is a cross-section taken on line 5—5 of FIG. 3 showing the top of the substrate laminated to a desired fabric.

FIGS. 1 and 2 schematically represent a warp knit, weft inserting knitting machine 10 which is employed to provide the substrate fabric 12 shown in FIGS. 3 and 4. To this end, the knitting yarn 14 supplied from the warp beam 16 through the guide bars 18 of the machine 10 to the needles 20 is a 70 denier, 34 filament DuPont type 56 polyester. The lay-in filling yarn 22 supplied from side mounted creels (not shown) to the rotating screw type member 23 is a 300 denier, 68 filament, DuPont type false twisted textured polyester yarn which extends across the wales of the fabric. Inserted over the fill lay-in yarn 22 is a 65/35 polypropylene/polyester non-woven web sheet 30 of 1.30 ounces/square yard. As shown in FIG. 2, the non-woven web 30 is supplied over the fill yarns 22 as the needles 20, guide bars 18 and sinker 31 co-act in conventional manner to knit the yarn 14 in a chain stitch to lock in the lay-in fill yarns 22 on the face or top side of the substrate with the non-woven web 30 being located thereunder and taken up on roll 24. As shown in FIGS. 3, 4 and 6, the knit yarn 14 secured the fill yarn 22 in position to stitch through and lock the non-woven web material 30 in a fixed position in the substrate. It should be pointed out that whether the non-woven web is located over the fill yarns 22 or under the fill yarns is not critical to the invention since both locations can be readily accomplished on a conventional warp knit, weft inserting machine without affecting the substrate construction.

After the substrate fabric 12 has been knit it has a very flat appearance due to the compression of the non-woven material 30 in the knitting process. To restore the bulk of the fabric the fabric is washed in a conventional washer at a temperature of about 120° F. and tumble dryed at temperatures of 70° C. The washing and tumble drying allows the textured filling lay-in yarn 22 to contact allowing the substrate to bulk and regain substantially all of the original thickness of the non-woven fabric 30.

After the substrate fabric 12 has been bulked it is laminated to a woven polyester/cotton pongee or poplin fabric 34 to form the laminated fabric 36 shown in FIG. 5. The laminated fabric is formed on a conventional laminator and uses a hot melt adhesive 32 having a melting point below that of the polypropylene in the non-woven web material 30. The adhesive can be a low melting point polyurethane or polyamide.

As indicated above the preferred substrate fabric 12 has a 70 denier, 34 filament DuPont type T-56 flat polyester filament warp yarn with 20 wales per inch and 17 courses per inch. The lay-in fill yarn is a 300 denier, 68 filament false twisted textured DuPont type T-56 polyester yarn laid in at 17 picks per inch. Preferably, the non-woven substrate is a 65/35 polypropylene/polyester fabric with the polypropylene fibers each being about (0.1 denier) and the polyester fibers each being about (6.0 denier). For an efficient insulating material the polyester fiber in the non-woven material should be equal to or in excess of 65% by weight.

The table below illustrates the effect of the washing and tumble drying on the composite substrate fabric 12.

TABLE 1

| PROPERTY | NON-WOVEN | COMPOSITE BEFORE BULKING | COMPOSITE AFTER BULKING |
|---|---|---|---|
| Thickness (inches) | 0.08 | 0.04 | 0.08 |
| Weight (oz./yd.$^2$) | 1.30 | 3.00 | 4.30 |
| Air Permeability (Cubic Feet/Min.) | 117 | 45 | 47 |
| Insulation Value* | 1.00 | 0.53 | 0.96 |

Insulation value was determined by wrapping a heated cylinder with the test material and measuring the rate of cooling of the cylinder in minutes per degree. These measurements were normalized so that the original non-woven was equal to 1.0. Thus the lower the number the less the insulating value.

It can readily be seen that we have provided a substrate fabric and method of producing same which maintains the integrity of the insulating medium while at the same time provides a fabric construction which can be readily and economically produced and laminated to a desired construction for use as a garment.

Although the preferred embodiments have been described in detail, it is contemplated that many changes may be made without departing from the scope or spirit of the invention and therefore, I desire to be limited only by the claims.

I claim:

1. A laminated fabric comprising a shell fabric laminated to a substrate fabric, said substrate fabric being a warp knit fabric having a face side and a rear side, a plurality of rows of continuous filament textured polyester weft yarn laid in on one side of said knit fabric, a layer of non-woven fabric adjacent said weft yarn and a plurality of wales of a chain stitched polyester spaced along the course direction of said substrate fabric and being knit through said non-woven fabric and holding said non-woven fabric and said weft yarns in position, said non-woven fabric containing at least 65% by weight of polypropylene fibers to provide insulating properties to said substrate fabric.

2. The fabric of claim 1 wherein said non-woven fabric is 65/35 polypropylene/polyester blend and said warp and weft yarns are polyester.

3. A knit substrate fabric comprising: a warp yarn, a lay-in fill yarn and a non-woven fabric, said substrate fabric being a warp knit fabric having a face side and a rear side, a plurality of rows of false twist textured polyester continuous filament weft yarn laid in on one side of said knit fabric, a layer of non-woven fabric adjacent said weft yarn and a plurality of wales of a chain stitched polyester spaced along the course direction of said substrate fabric and being knit through said non-woven fabric and holding said non-woven fabric and said weft yarns in position, said non-woven fabric containing at least 65% by weight of polypropylene fibers to provide insulating properties to said substrate fabric.

4. The fabric of claim 3 wherein said non-woven fabric is 65/35 polypropylene/polyester blend and said warp and weft yarns are polyester.

5. A method for producing a knit insulating fabric comprising the steps of: providing a non-woven fabric having at 65% by weight of polypropylene fibers, laying in a plurality of textured polyester weft yarns in the course direction of said fabric adjacent the non-woven fabric, chain stitching a plurality of polyester warp yarns in the wale direction through the non-woven fabric, bulking the insulating fabric by washing and drying the fabric after it has been knit, and laminating said insulating fabric to a shell fabric after said insulating fabric has been bulked.

* * * * *

UNITED STATES PATENT AND TRADEMARK OFFICE
CERTIFICATE OF CORRECTION

PATENT NO. : 4,497,863

DATED : February 5, 1985

INVENTOR(S) : Jerry A. Cogan, Jr.

It is certified that error appears in the above-identified patent and that said Letters Patent is hereby corrected as shown below:

Column 2, line 62, after "polyester" insert --yarn--.

Signed and Sealed this

Ninth Day of July 1985

[SEAL]

Attest:

DONALD J. QUIGG

Attesting Officer     Acting Commissioner of Patents and Trademarks